United States Patent [19]

Meshbesher

[11] 4,347,109

[45] Aug. 31, 1982

[54] METHOD FOR MAKING ACETALDEHYDE FROM ETHANOL

[75] Inventor: Thomas M. Meshbesher, Edina, Minn.

[73] Assignee: Electrohol Corporation, Edina, Minn.

[21] Appl. No.: 199,939

[22] Filed: Oct. 23, 1980

[51] Int. Cl.³ .......................... C25B 3/02; C25B 8/00; C07C 45/29
[52] U.S. Cl. .................................. 204/5.9 R; 204/78; 204/DIG. 4; 429/13; 429/27; 435/165; 568/853
[58] Field of Search .................... 435/165; 429/27, 13, 429/29, 15; 568/853; 204/DIG. 4, 78, 59 R

[56] References Cited

U.S. PATENT DOCUMENTS

| | | | |
|---|---|---|---|
| 607,091 | 7/1898 | Simonsen | 435/165 |
| 2,108,030 | 2/1938 | Darrah | 204/79 X |
| 2,152,371 | 3/1939 | Wyler | 568/853 |
| 2,419,515 | 4/1947 | Wolk | 204/79 X |
| 2,964,449 | 1/1960 | Thomsen | 435/165 |
| 3,245,890 | 4/1966 | Klass | 429/12 X |
| 3,252,837 | 5/1966 | Satterfield et al. | 429/13 |
| 3,280,014 | 10/1966 | Kordesch et al. | 204/79 X |
| 3,284,239 | 11/1966 | Hunger et al. | 429/12 X |
| 3,316,161 | 4/1967 | Jung et al. | 429/12 X |
| 3,468,717 | 9/1969 | Waters et al. | 429/27 |
| 3,990,944 | 11/1976 | Gauss et al. | 435/165 |
| 4,195,118 | 3/1980 | Vaseen | 429/15 |

FOREIGN PATENT DOCUMENTS 910870 11/1962 United Kingdom .
966429 8/1964 United Kingdom .

OTHER PUBLICATIONS

Langer et al., Ind. Eng. Chem. Proc. Des. & Devel., vol. 18, No. 4, pp. 567, 568, (1979).
Schlatter, Fuel Cells, p. 198, pub. by Reinhold, N.Y., (1963).
Basic Principles of Organic Chemistry by Roberts et al., pp. 400, 401, 448, 449, pub. by Benjamin, Inc., N.Y., (1965).
Schlatter, M. J. in *Fuel Cells*, G. J. Young, Editor, Reinhold, N.Y, N.Y., 1963, pp. 199-210.
Vielstich, W., *Fuel Cells*, Wiley-Interscience, 1965, pp. 99-101.
Rightmire et al., *J. Electrochem. Soc.* 111:242 (1964), pp. 242-247.
Langer et al., *I. & E. Chem. Proc. Des. Dev.* 16:567 (1979), pp. 567, 568, 569, 570, 571, 578, 579.
Langer et al., *J. Electrochem. Soc.* 122:1619 (1975), pp. 1619-1626.
Kirk-Othmer, *Encyclopedia of Chemical Technology*, 2nd Ed., vol. 1, (1963), pp. 84-85.

*Primary Examiner*—F. Edmundson

[57] ABSTRACT

Acetaldehyde is obtained from an ethyl alcohol "fuel" anodically treated in a fuel cell, and the acetaldehyde (along with any evaporated, unreacted ethanol "fuel") is ultimately recovered in anhydrous or substantially anhydrous form. Further chemical and electrochemical transformation of acetaldehyde in the presence of the fuel cell anode is stopped or minimized to avoid the formation of condensates or polymers or more highly oxidized products (e.g., acetic acid or aldol condensates) which may act as catalyst poisons. For example, ethyl alcohol can be vaporized and fed to the gas side of a gas-permeable fluid-impermeable electrode, in which case up to 60 mole-% or more of the acetaldehyde product stays with the vapor stream and avoids further chemical reactions or side reactions, substantially the balance going into solution in the electrolyte, from which it can be recovered, e.g., by low temperature distillation.

12 Claims, No Drawings

METHOD FOR MAKING ACETALDEHYDE FROM ETHANOL

TECHNICAL FIELD

This invention relates to the oxidation of ethanol (ethyl alcohol) to useful organic compounds, principally acetaldehyde. Another aspect of this invention relates to a process for obtaining useful organic compounds (principally acetaldehyde) from a fermentation beer under conditions involving a minimal loss or expenditure or energy.

PRIOR ART

In recent years, there has been a resurgence of interest in the fermentation of carbohydrates to fuels, solvents, and other useful organic compounds. Ethyl alcohol, for example, can be obtained from sugars, starches, celluloses and hemi-celluloses, and other carbohydrates with reasonable efficiency via enzymatic or microbiological conversion or fermentation—a process which has been carried out since ancient times but practiced on a well-controlled commercial scale only since the time of Louis Pasteur. Ethanol (ethyl alcohol) is highly useful as, inter alia, a fuel, a beverage ingredient, a solvent, and a raw material for the manufacture of other chemicals such as acetic acid and acetaldehyde. Much of the recent interest in ethanol-producing fermentation processes has resulted from rising energy costs. Ethanol, being a "renewable" fuel is at least potentially stable in cost, particularly as compared to petroleum-based fuels. Furthermore, ethanol has a high blending octane value, is relatively clean burning, and its production from vegetable matter can generally provide a high-protein residue which may be as valuable as the ethanol itself.

One of the largest roadblocks standing in the way of increased manufacture of fuel alcohol (principally ethanol) from carbohydrates is the large energy cost of alcohol recovery. Although solvent extraction with gasoline, reverse osmosis, and other low energy-consumption processes for recovery have been proposed, the most-used recovery process is still distillation. The energy consumed during distillation is largely a function of the "proof" value of the distillate. Obtaining 90 U.S. proof ethanol involves a modest energy expenditure; obtaining a 190 to 200 U.S. proof distillate may involve an uneconomic or even prohibitive energy expenditure, absent a suitable source of either solar or waste heat to "pay" for the complete distillation with low-cost energy. Unfortunately, some commercial uses of ethanol (e.g., as a gasoline additive) require essentially 200 U.S. proof alcohol. The full promise of ethanol as a "renewable" fuel or solvent may not be obtained unless alternatives to conventional alcohol distillation are further explored.

Among the uses of ethanol as a raw material is in the manufacture of aldehyde. In a commonly used process, ethanol is passed over a silver catalyst at elevated temperatures, e.g., about 400° C. or more. Newer techniques for making acetaldehyde from ethyl alcohol have been developed, but these techniques may also involve high temperatures or energy input.

SUMMARY OF THE INVENTION

Briefly, this invention involves providing conditions for an electrochemically specific, anodic oxidation of ethyl alcohol in a fuel cell environment. Ethyl alcohol has not been widely used as a fuel for fuel cells for several reasons, one of which is its relative inability to be anodically oxidized to carbon dioxide, particularly as compared to methanol, formic acid, and even some hydrocarbons. The oxidation products of ethyl alcohol can poison or coat or be chemisorbed upon a fuel anode catalyst unless they are promptly removed from the electrolyte, and suitable removal steps or apparatus can add complexity to the fuel cell system. The existence of these difficult-to-oxidize products produced by ethanol fuel cells are a possible cause of the low output voltage of these cells (i.e., lower than theoretical). Furthermore, the heat generated by the cell tends to distill off some of the ethanol "fuel".

These drawbacks can be overcome or even used to advantage when an ethanol (e.g., ethanol/$O_2$) fuel cell is used for electrogenerative synthesis of organic products, particularly if the conditions are arranged to favor production of acetaldehyde (ethanal, $CH_3CHO$), a low-boiling chemical with a vapor pressure of about one atmosphere at normal room temperature (20°–25° C.). Present-day economics also favor this product, since it is worth (as 99% by weight $CH_3CHO$) slightly more per kilogram than 200 proof ethanol. Furthermore, a portion of the capital cost and the high temperature requirements of high-volume acetaldehyde production by chemical oxidation over a silver catalyst can be avoided with this invention, which contemplates economical low-volume production from inexpensive intermediates containing normally unattractively small amounts of the ethanol starting material.

Viewed from the objective of producing a combustible fuel from dilute aqueous ethanol, the recovered acetaldehyde admittedly has less heat-of-combustion energy value (determined, for example, in kg/cal/g or k-cal/mole or BTU/gal, etc.) than pure ethanol, but at least part of this energy value difference can be "recovered" in the form of the heat energy and electrical energy output of the fuel cell reactor. (Fuel cells are not limited by the Carnot cycle and can be more than 40 or 50% efficient, even under adverse conditions.)

Accordingly, this invention contemplates selective removal of the acetaldehyde product from the electrolyte of the fuel cell by means modest in their energy consumption, such as distillation (and, if necessary, redistillation) at relatively low temperatures and suitable pressures. Taking the oxidation products in the electrolyte (or anolyte, if the fuel cell is provided with a suitable separator) out of the oxidation reaction (e.g., by a circulating electrolyte system) helps to avoid poisoning of the catalyst and formation of undesirable by-products. Normal cell heat output can be used directly or via heat exchanges to provide useful distillation of ethanol and acetaldehyde at temperatures below the boiling point of water (e.g., below 90° C.).

In short, this invention contemplates the manufacture of acetaldehyde from ethyl alcohol by a process comprising the steps of:

(a) bringing a "fuel" comprising ethyl alcohol into contact with an anode of a fuel cell, which fuel cell includes the anode, a cathode, an electrolyte within the cell, and external circuit means electrically connecting the cathode to the anode, exterior to the fuel cell;

(b) anodically treating the "fuel" by electrogeneratively oxidizing the ethyl alcohol to acetaldehyde at the anode, thereby producing a flow of current in the external circuit means at a voltage in the circuit means ranging from about 1–1000 millivolts (typically < 700 mv);

(c) taking at least the products of the resulting anodically treated fuel out of the oxidation reaction to avoid the formation of condensates or more highly oxidized products at the anode; and (d) recovering a major amount of the thus-produced aldehyde.

As will be apparent from the following discussion, a particularly preferred source for the "fuel" is a fermentation beer, which typically contains about 2–20% by volume ethyl alcohol. The fuel cell, i.e., the electrogenerative reactor, can be operated at relatively low temperatures, e.g., 15°–90° C., preferably less than 70° C. (both ambient and internal).

DETAILED DISCUSSION

This invention could be viewed as a method for avoiding a major share of the cost of ethanol recovery from dilute, ethanol-containing intermediates through recovery of acetaldehyde instead—an equally valuable but more easily recovered product—using electrogenerative oxidation in a fuel cell reactor to convert the ethanol-containing "fuel" to the aldehyde. In the typical practice of this invention, the ethanol-containing intermediate is upgraded in various ways to make it a suitable "fuel", relatively free of catalyst poisons. Since pure water is not a catalyst poison, the proof value of the "fuel" is not critical and can be substantially less than 190 or 200 proof—indeed, either a distillate or a vaporized "fuel" containing only a few percent ethanol can be useful in this invention.

That is, it is normally desirable to start with an ethanol-containing "fuel" which is substantially free of catalyst poisons, but pure or even concentrated ethanol is not required, so long as, under the conditions of fuel cell reactor operation, any diluent is a relatively inert or non-poisoning material such as liquid water, steam or water vapor, carbon dioxide, nitrogen, purified halohydrocarbons, low molecular weight hydrocarbons, or the like. Even catalyst poisons can be tolerated to a degree if they are not oxidized to interfering by-products and are removeable from catalyst surfaces, a typical example of such a poison being acetone. Low molecular weight hydrocarbons such as methane, ethane, and even propane or butane react very slowly in low temperature fuel cells and hence are "relatively inert". Halohydrocarbons such as the fluorinated alkanes are "relatively inert" when sufficiently purified so as not to contain free halogen.

The supernatant fluid or broth from an alcohol-producing fermenter (i.e., a fermentation "beer") coincidentally provides an approximately 0.5 to 4 molar ethanol solution, which is a reasonably suitable range of concentration for fuel cell operation. By-products present in typical carbohydrate-to-ethanol fermentation beers may include acetaldehyde and other aldehydes, acetic acid and other acids, esters, dissolved carbon dioxide, acetone, polyols (e.g., 1,4-butanediol), higher alcohols (propyl alcohol, butyl alcohol, etc.), other oxygen-containing aliphatic compounds, live or dead cellular material, proteins, unreacted sugars, and inorganic salts, substantially the balance being water. With proper control of the fermentation feed and fermentation conditions and microorganisms or enzymes, these by-products can be minimized. For example, ordinary brewer's yeast or the enzyme zymase provides a reasonably good "beer" comprising 2–20 vol.-% ethyl alcohol (more typically 3–15 vol.-%) and small amounts of by-products which can be removed or reduced in concentration through conventional means. Fermentation feedstocks rich in monosaccharides (such as glucose) and readily hydrolyzed starches also help to insure low by-product concentrations. Bacterial fermentation of carbohydrates (e.g., by the Weizmann technique) can produce a beer containing, for example, ethanol, n-butanol, and acetone. Conventional distillation procedures provide from these beers an ethanol-rich fraction as well as butanol- and acetone-rich fractions.

Ethyl alcohol produced by hydrolysis of ethyl sulfates is another source of a reasonably pure aqueous ethanolic medium. This hydrolysis mixture typically contains aqueous sulfuric acid (e.g., 50–60%), ethanol, and ethyl ether. Separation in a stripping column typically produces a gaseous "overhead" mixture containing ethanol, ethyl ether, and water vapor. Ethyl ether is reportedly inert in most fuel cell environments, though it may have a poisoning effect. If the poisoning can be reversed, the fuel cell anode will usefully distinguish between the ether and the alcohol, oxidizing more alcohol than ether. (A similar phenomenon can occur with ethanol-acetone mixtures; even ethanol-amyl alcohol mixtures will produce much less valeric aldehyde as compared to acetaldehyde.)

The preferred ethanol source is a fermentation beer, which is ordinarily not fed as is to a fuel cell. A "selective permeable membrane" technique for separating active or dead cellular material and unfermented residues from fermentation products is suggested by Hunger et al in U.S. Pat. No. 3,284,239, issued Nov. 8, 1966. Hunger et al permit the fermentation products to diffuse directly into the anode compartment of a fuel cell. This technique is not preferred in the context of this invention, particularly if unfermented mono- and diglycerides capable of diffusing through the membrane and/or raising the osmotic pressure may be present in the fermentation zone. Filtration or permselective membrane separation steps conducted entirely external to the fuel cell can be used in this invention, however. Solvent extraction is also a suitable technique for separating the ethanol from the beer, provided that the solvent is not a catalyst poison and is relatively inert compared to ethanol under the electrogenerative oxidation conditions utilized in this invention. In the case of hydrocarbon solvents, the smaller the carbon chain, the less tendency there is for the solvent to be oxidized by a fuel cell anode at temperatures below 100° C. Methane, for example, is almost totally inert in low temperature fuel cells, while hexane may be more reactive. Even hexane, however, is anodically oxidized rather slowly at low cell operation temperatures (e.g., 15°–90° C.). Tertiary alcohols are also rather inert in low temperature fuel cells. Still another useful technique includes "salting out" of the ethanol with alkali metal halides or the like.

Surprisingly, vaporization (e.g., distillation) techniques have been found to be the preferred means for converting a fermentation beer into a useful "fuel" or feed for the anode of the fuel cell reactor. Distillation is normally assumed to be a highly energy-consuming means for recovering alcohol from a beer, absent a suitable source of inexpensive heat (e.g., waste heat from nearby industrial operations). In this invention, however, refluxing, multi-column or multi-plate fractionation, and other time-consuming or energy-consuming distillation/concentration operations can be minimized, since water is not a fuel cell catalyst poison and can be present in the "fuel" or anode feed in virtually any proportion up to about 98 or 99% by weight. Even the simplest of distillation techniques can produce either a distillate or a gaseous "overhead" substantially free of virtually all fermentation beer constituents other than water and ethanol, aldehydes and the like being easily removed. This is particularly true in the case of fermentation beers produced by the action of zymase or yeasts on good quality carbohydrate substrates (sugars, hydrolyzed starches, etc.).

The ethanol-rich fraction obtained by distillation of a bacterial fermentation beer contains only small amounts of acetone (a tolerable poison) and n-butanol (a slow-reacting, non-poisonous "fuel" which may be anodically oxidized to n-butyraldehyde but less easily than oxidizing ethanol to acetaldehyde). Butyraldehyde is normally less valuable than n-butanol, hence large amounts of this by-product are not normally desired. However, the physical constants of butyraldehyde do permit separation from acetaldehyde without significant energy expenditures. Alcohols obtained from aldol condensates of lower aldehydes have substantially commercial utility.

Since the vapor pressure of ethanol at normal atmospheric pressures and temperatures is higher than that of water, distillation of any water-alcohol mixture produces a vapor enriched in ethanol. A single pass, without refluxing, through a fractionating column of modest height can easily produce from a vapor containing more than 15% by weight of ethanol, more typically above 30 or 40% by weight. This vapor can be condensed to provide a 20-100 U.S. proof distillate, and minor improvements in the distillation process can raise the proof value well about 100 proof (e.g., to 120-170 proof). The amount of poisons and extraneous organic substances in the distillate (e.g., acetic acid and fusel oil) will normally be within tolerable limits, e.g., a fraction of 1%. Condensation of the distilled vapors to a distillate is not necessary; the vapors can be fed directly to the anode of a fuel cell of the type described by Kordesch et al in U.S. Pat. No. 3,280,014, issued Oct. 18, 1966, or similar anodes capable of providing a gas/electrode/electrolyte interface, as will be explained subsequently.

To virtually eliminate poisons, a beer can be distilled, condensed, filtered through charcoal or the like (as in the manufacture of 80-100 proof vodka), and then fed to the anode, as liquid aqueous ethanol, or after revaporizing to an alcohol-water fuel vapor mixture. The Kordesch et al cell configuration will also accept liquid fuels.

Energy requirements for simple or single-pass distillation or distillation with modest refluxing can be further reduced by adding to the beer a non-poisoning organic compound such as hexane, which is anodically oxidized very slowly at room temperature and which forms water-hexane-ethanol mixtures boiling at less than 70°, e.g., about 50° C. Alternatively, the beer can be enclosed in a room temperature or moderately heated saturator device, through which an inert gas carrier is bubbled to carry away the vapor which inherently forms in the device. Suitable inert gases include steam, oxygen-free nitrogen and carbon dioxide; methane; ethylene and ethane, or even some higher molecular weight hydrocarbons; purified halohydrocarbons; and various waste gases or digester gases, which typically contain constituents such as methane, carbon dioxide, nitrogen and water vapor; provided that these waste gases have been purified of sulfur dioxide, carbon monoxide, nitrogen oxides, and similar catalyst poisons or potential "fuels".

Hydrogen is present in some of the gas mixtures, but is not a poison, since it reduces catalyst oxides and becomes converted to water in the fuel cell, but competition between ethanol and hydrogen may not be desirable.

If the "fuel" is supplied to the anode in liquid form, its pH can be increased or decreased with mineral acids or bases. Although Lewis acids or bases can be added, these "acids" and "bases" would preferably qualify as such in the narrow, Arrhenius sense. That is, the preferred "acids" are compounds capable of dissociating or ionizing in water to yield protons and anions, and the "bases" are compounds such as the alkali metal hydroxides which dissociate to yield cations and hydroxyl ions. A purpose of the pH adjustment (if any) is to make the "fuel" more like a fuel cell electrolyte. Alcohol-fueled fuel cells are normally very inefficient with neutral electrolytes. Basic electrolytes (e.g., 0.1-15 N KOH or NaOH or other alkali metal hydroxides) improve the efficiency of alcohol/air fuel cells to a marked degree and do not require expensive noble metal catalysts (e.g., Pt., Pd., etc.), since there are less expensive metal catalysts which are alkali-resistant. Acid electrolytes (e.g., 0.1-10 N sulfuric acid, phosphoric acid, and perchloric acid) may make the use of noble metal catalysts virtually mandatory; however, there is less risk of high polymer by-products with acidic electrolytes. Furthermore, any carbon dioxide which may be present or may be generated is rejected by acidic electrolytes.

Since an important goal of this invention is to convert ethyl alcohol to acetaldehyde with minimal energy losses, and since high current density at the anode and cathode of the fuel cell can be a matter of less importance, selection of catalysts is less critical in the context of this invention than it would normally be in fuel cell technology. For example, a simple, non-platinized, porous carbon air or oxygen cathode can do an adequate job in an alkaline fuel cell. If expensive catalysts such as platinum are used, electrode costs can be reduced in a known manner through the platinizing of relatively inexpensive catalytic surfaces or the extension of platinum, e.g., with inert inorganic materials, organic fluorinated polymers such as polytetrafluoroethylene (PTFE), and other non-corroding materials.

The fuel cell cathode can be an air cathode or an oxygen cathode, and air is of course the most inexpensive oxidant or depolarizer. Besides air or oxygen, other oxidizing agents such as hydrogen peroxide and nitric acid have been successfully used in alcohol-fueled fuel cells. Ideally, the catalyst at the cathode would be effective only for reducing the depolarizer or oxidant while the anode catalyst would be effective only for oxidizing the organic fuel. While this ideal cannot be totally achieved in practice, skilled fuel cell technicians have approximated the ideal, and suitable catalyst selection is within the skill of the fuel cell art. Fuel cells and their electrolytes have also been effectively compartmentalized into anolyte and catholyte zones, e.g., through the use of separators which permit internal current flow or ion exchange between anode and cathode compartments but minimize undesirable concentration gradient effects.

Other known anode catalysts include other Group VIII metals such as palladium, rhodium and nickel; Group I-B catalysts such as silver, gold, and copper; and Group II-B catalysts such as mercury. Combinations and alloys of these various metals have been used, e.g., the Ag-Ni catalyst described by Ruetschi in U.S.

Pat. No. 3,020,327, issued Feb. 6, 1962, and the Justi double-skeleton catalysts. Oxides of these metals can also be useful. If the electrolyte is a strong acid (sulfuric, phosphoric, perchloric, etc.) this range of materials tends to be limited to the second and third triads of Group VIII of the Periodic Table. The nature of the "fuel" and the oxidant have a major effect on cathode and anode design. Liquid, water soluble fuels and oxidants present different problems and opportunities as compared to the gaseous ones. It has been assumed by many prior art investigators that the liquid, water soluble nature of ethanol called for a completely different cell design as compared to a hydrogen/oxygen cell. When the fuel cell is used to produce acetaldehyde electrogeneratively, however, these assumptions must be re-examined. It has surprisingly been found that liquid/liquid systems (liquid "fuel"/liquid electrolyte) are not necessarily superior to gas/liquid systems. Although this invention is not bound by any theory, it is theorized that the ethanol vapor/catalyst/electrolyte interface may favor the production of acetaldehyde, with prompt release of gaseous acetaldehyde from the surface of the gas side of the anode, thereby minimizing acetic acid production. This may explain why Esso Research (see British Pat. No. 910,870, published Nov. 21, 1962) and M. J. Schlatter (in *Fuel Cells*, ed. G. J. Young, Reinhold, N.Y., N.Y., 1963, pp. 204–205) obtained little or no acetaldehyde from an ethanol-fueled fuel cell reactor. While separation of the electrolyte into anolyte and catholyte and/or the use of different catalysts at the anode and cathode may both aid in selectively oxidizing ethanol, the most effective aid to selectivity is believed to involve prompt removal of acetaldehyde from the electrogenerative environment, by spontaneous distillation of this product from the electrolyte, circulation of the electrolyte to a neutralization or a distillation or an aldehyde-separation zone, sweeping of the electrolyte or anode with an inert gas, or release of acetaldehyde into the gas stream on the gas side of a fuel/anode interface.

Considerable experience has been obtained with both acid and alkaline alcohol/air and other alcohol fuel cells, because of the convenience of using methanol (methyl alcohol) as a fuel. Studies indicate that methanol/air cells and ethanol/air cells operate according to generally similar principles, and known methanol/air cell structures can theoretically be adapted to run on ethanol. There are some important differences between the two alcohols, however. Methanol is readily oxidized to formaldehyde (or its hydrates) in acid or alkaline methanol/air cells, but the resulting formaldehyde is not very stable in a fuel cell environment; it tends to be further oxidized to formic acid (or formates) and carbon dioxide. In acid electrolytes, the carbon dioxide is easily driven off. In basic electrolytes, the carbon dioxide is preferably removed (particularly for long-term cell operation) in a recirculating electrolyte (or anolyte) system, e.g., by adding calcium oxide to the recirculating electrolyte to precipitate calcium carbonate. Alternatively, the carbonate-containing electrolyte (or anolyte) can be discarded, whereby the electrolyte in contact with anode is constantly being refreshed. These types of electrolyte manipulations are useful in the present invention to permit acetaldehyde recovery external to the cell, but are unnecessary for carbonate removal, even when alkaline electrolytes are used. If the conditions of an ethanol fuel cell of this invention are properly manipulated, carbon dioxide formation is minimal. Calcium oxide addition to alkaline electrolytes plays a very minor role (if needed at all) in this invention. A more serious problem in alkaline ethanol-fueled fuel cells is aldol condensation and resin or polymer formation, a problem normally not encountered in methanol fuel cells. According to Wolk, U.S. Pat. No. 2,419,515, issued Apr. 22, 1947, aldol and polymer formation during electromechanical oxidation of ethanol is an alkaline electrolyte are governed by rate factors which permit adequate control measures. Wolk oxidized ethanol is an electrolytic cell rather than a fuel cell; in any event, however, he was confronted with a primarily chemical phenomenon: the tendency of acetaldehyde to enter into condensation and polymerization reactions in alkaline aqueous media. He controlled these reactions by manipulation of pH, temperature, and the time factor. Excess alkalinity can be neutralized periodically with acid. Low temperatures slow down both the aldol condensation reaction and polymerization of resin formation. And the aldol condensation reaction does not normally proceed quickly enough at 0°–20° C. to be completed in the anode compartment. Unlike Wolk's system, however, acetaldehyde is a desirable end product of this invention. Accordingly, in this invention the acetaldehyde is separated from an alkaline electrolyte as soon as possible by one or more of the foregoing methods. Cooling of the electrolyte (but not necessarily the "fuel" fed to the anode) can be used as in Wolk. Neutralization can best be used after circulating the electrolyte (or anolyte) from the cell, and acid as such need not always be added. Ion exchange columns, for example, can shift the pH of an aqueous medium by exchanging protons for metal cations or by exchanging weakly basic anions for hydroxyl ions. Thus, the condensation and resinification observed by Vielstich in *Fuel Cells*, Wiley-Interscience, 1965, pp. 99–101, may simply be the result of a failure to take advantage of rate phenomena.

According to theoretical electrochemical studies wherein a voltage is imposed upon the ethanol electrode and a standard hydrogen electrode rather than an oxygen cathode completes the cell, the oxidation of ethanol at a platinum electrode in sulfuric acid proceeds in distinct stages; direct oxidation of ethanol to acetic acid does not occur. See Rightmire et al, J. Electrochem. Soc. 111:242 (1964). According to Rightmire et al, the principal product of the oxidation is acetaldehyde, and subsequent oxidation of acetaldehyde to acetic acid is relatively slow. Oxidation of acetic acid to carbon dioxide was simply not detected by Rightmire et al. Similar results are reported by Vielstich in *Fuel Cells*, op. cit. Actual use of ethanol as a "fuel" in electrogenerative fuel cell reactors would appear to produce different results, however; see the aforementioned British Pat. No. 910,870 and the M. J. Schlatter article, pp. 204 and 205. Thus, in an actual working fuel cell environment, acetaldehyde may behave much like the formaldehyde and formaldehyde hydrate products in a methanol/oxygen cell. Although this invention is not bound by any theory, it is believed that rapid evolution of acetaldehyde from the fuel cell reactor, circulation of the electrolyte, or otherwise taking the acetaldehyde out of the oxidation reaction is an important factor which helps to avoid formation of more highly oxidized products, principally acetic acid. (British Pat. No. 910,870 reports the production of minor amounts of carbon dioxide and formic acid in addition to acetic acid.) In this invention, acetic acid or acetate does not get a chance to form. The acetaldehyde product is removed and/or distilled off before it can poison the catalyst or form aldol condensation products, dimers, trimers, acetals, higher polymers, etc.—or, these condensation products are formed external to the cell and can be filtered off or otherwise removed. (Acetaldehyde itself can be a catalyst poison.) Acetaldehyde can be recovered from an electrolyte external to the cell by means other than distillation, e.g., by known addition reactions, which form insoluble precipitates. Acetaldehyde can be regenerated from such precipitates (oximes, hydrazones, semicarbazones, etc.) at modest reaction temperatures. Acetaldehyde even forms an insoluble dimer. If distillation is used, the acetaldehyde can be fractionated and condensed to anhydrous acetaldehyde in a condensation zone, all external to the cell, if desired. Heat exchange (e.g., with recirculating electrolyte) can be used to take advantage of cell heat and to help cool the cell down to the desired 15°-90° C. or, preferably, 15°-70° C., operating temperature. The ordinary low temperature fuel cell operating temperatures seem to be hot enough to favor rapid acetaldehyde evolution. Evolution from the electrolyte can be facilitated by venting of the electrolyte (or anolyte) compartment or through use of an external separation or distillation or fractionation zone to which the electrolyte (or anolyte) is circulated. Since an ethanol/oxygen or ethanol/air cell forms water as a reaction product, circulation of the electrolyte or venting of the electrolyte compartment may be useful in any event to prevent excessive dilution of the electrolyte. Both venting and electrolyte circulation have been used in hydrogen/oxygen cells to maintain a constant concentration of acid or base in the electrolyte.

Some of the complexity of the circulating systems can be avoided by removing the anode from the electrolyte or periodically opening the external circuit of the fuel cell, so that the cell itself can be used as a distillation zone, in alternation with its use as an electrochemical oxidizing means. It is preferred to operate the fuel cell reactor continuously, however.

The voltage of the fuel cell reactor can be controlled by controlling the load, providing reverse bias, periodically opening the external circuit, etc. to insure further that conditions favorable for oxidation of acetaldehyde to acetic acid will not occur. Typical output voltages for an alcohol/air cell range from about 1-1000 millivolts, more typically 10-700 mv, at modest but useful current densities, e.g., above 5 ma/cm$^2$ at 100-400 mv, above 10 ma/cm$^2$ at about 100-375 mv, and above 40 ma/cm$^2$ at 50-150 mv for a heavily loaded Pt anode. In acid alcohol/air fuel cells, water is produced at the air cathode, making a catholyte/anolyte compartmentaliztion useful to prevent comingling of aldehyde or alcohol vapors with water vapor. Circulation of the anolyte to a fractionation column heated by heat exchange with the fuel cell, coupled with cooling of the distillate fractions, provides an economical route to the recovery of the liquid acetaldehyde reaction product and unreacted but evaporated ethanol "fuel".

In the cell configuration disclosed by Kordesch et al (U.S. Pat. No. 3,280,014), and in other configurations in which the "fuel" passes through a compartment separated from the electrolyte by the catalytic anode, unreacted ethanol "fuel" can be transported to a second cell of similar configuration. Cell "stacks" arranged in series and/or parallel are well known in the fuel cell art.

The literature regarding alcohol/oxidant electrochemical cell configurations is extensive; see, for example, Tarmy, Proc.Ann. Power Sources Conf. 16:29 (1962), Justi et al, *J. Electrochem. Soc.* 108:1073 (1961) and Grimes et al (of Allis-Chalmers Mfg. Co.), Proc. of the 15th Ann. Power Sources Conf., 9-11, May, 1961. However, typical hydrogen/oxygen fuel cell configurations (including the intermediate-temperature or high pressure type with a recirculating electrolyte system) are more easily adapted to this invention, as are the configurations shown in FIGS. 1-3 of U.S. Pat. No. 3,280,014 (Kordesch et al). Other useful configurations and systems are described in Langer et al, Ind. Eng. Chem. Process Des. Dev. 18:567 (1979) at page 568 FIG. 1) and J. Electrochem. Soc. 122:1619 (1975), at page 1620 (FIGS. 1 and 2), even though these cells were designed for electrogenerative hydrogenation.

In a liquid/liquid type of ethanol fuel cell, spontaneous distillation of the ethanol fuel from the electrolyte is likely to be encountered, due to the high vapor pressure of ethanol (over 40 mm of Hg at 20° C.) even at low operating temperatures (e.g., 15°-90° C.). This spontaneous distillation, however, can be the basis for some alcohol recovery in addition to acetaldehyde production. Monomeric acetaldehyde in the distillate is easily fractionated from the distilled ethanol because of the large difference in boiling points (about 50 Celsius degrees). (There are other known techniques for cleaning separating ethanol from acetaldehyde, e.g., by $NaHSO_3$ addition.) Accordingly, the fuel cell can be vented and provided with a condenser for such distillates.

In various media, acetaldehyde can dimerize, trimerize, and form higher polymers. It can be useful to trimerize the recovered, reasonably pure acetaldehyde (boiling point, 21° C., melting point, −123.5° C.) to para-acetaldehyde, known also as "paraldehyde", "paracetaldehyde", and 2,4,6-trimethyl-1,3,5-trioxane (boiling point, 124.5° C., melting point 12.6° C.). This trimer is reasonably stable in neutral media and has a much lower vapor pressure than the monomer—only 25.3 mm of Hg at 20° C. In many industrial processes and syntheses, the trimer is used in place of the monomer. Its relatively high freezing point may be of use in fractional crystallization.

Conversion of acetaldehyde to paraldehyde (the trimer) can be carried out on a commercial scale at moderate temperatures with a sulfuric acid/phosphoric acid catalyst as in U.S. Pat. No. 2,864,827 (Baer et al) issued Dec. 16, 1958. Circulation of the gaseous acetaldehyde produced by the fuel cell directly to a column or system containing acidic cation exchange resin (e.g., the acid form of sulfonated polystyrene) can be convenient for continuous conversion, as described in Chem. Abs. 60:14380d (1964), 63:604e, 82:170843n (1975), 83:28199j (1975) and 77:100649b (1972).

If it is not convenient to store, containerize, or sell the acetaldehyde or paraldehyde produced by this invention, acetaldehyde is a reasonably good fuel and can simply be burned on site as a gas turbine fuel, an external combustion engine fuel, a space heating fuel, etc. In addition, acetaldehyde is miscible with standard fuels such as fuel oil and reportedly promotes fuel oil combustion. Its heat of combustion is reported to be about 279 K-cal/mole (20° C., 1.0 atm. pressure) (6.388 Kg-cal/g or 11,398 BTU/lb. or about 73,900 BTU/gal.), which compares favorably to ethyl alcohol (328 Kg/cal/mole or 7.12 Kg/cal/g). Alternatively, acetaldehyde can be readily converted to other useful chemicals such as acetic acid, acetal, or pentaerythritol without complex processing steps.

Acetaldehyde has even been used as an internal combustion engine fuel. In spark-ignition engines, acetaldehyde knocks violently—much like ether. Accordingly, it will ignite readily in compression-ignition engines (e.g., diesels) at modest compression ratios. Both acetaldehyde and paraldehyde have been suggested as diesel fuel additives (e.g., to raise the cetane number). The paraldehyde can be stabilized with other additives. A Canadian research team succeeded in running a "cool", constant-r.p.m. internal combustion engine on acetaldehyde without excessive knock. The air supply for the engine was cooled to 10° C. and the cooling jacket water was kept at 35° C.

EXAMPLE 1

Cell Assembly and Polarization Run

Essentially the electrogenerative cell structure described in FIG. 1 on page 1620 of J. Electrochem. Soc. 122:1619 (1975) was used in this Example. This cell comprised opposed "KEL-F" (trademark for polytrifluorochloroethylene) face plates 2.5 in. square×0.25 in. thick (64.5 mm square×6.45 mm thick); a 1.0 in.-(25.4 mm)-diameter polytetrafluoroethylene (PTFE) spacer screen inside of each face plate; suitable gaskets inside the spacers; a 1.25 in.-(31.75 mm)-diameter gas permeable, liquid impermeable, PTFE-backed platinum cathode in contact with one side of an electrolyte chamber and a gas permeable platinum anode of the same dimensions and the same structure in contact with the other side of the chamber, the anode and cathode having been sealed in place by gaskets on both sides of each electrode; a pair of 1.25 in. (31.75 mm)-diameter, 45 U.S. mesh platinum screen current collectors, one in contact with the inside face of the anode and one in contact with the inside face of the cathode ("inside" means facing toward the electrolyte or the central interior of the cell), each current collector being provided with a platinum tab to conduct current to the external circuit in which the cell is placed; and an electrolyte chamber with 25.4 mm-diameter apertures on each side to allow for an electrode/electrolyte interface on the cathode side and the anode side. The electrolyte chamber is 2.5 in. (64.5 mm) square and 0.25 in. (6.45 mm) thick. The platinum cathode and anode each contained 25 mg/cm$^2$ of platinum and were thus highly active electrodes. The electrode (cathode or anode) thickness was approximately 0.007 in. (0.178 mm) thick, and the PTFE backing for the platinum-containing electrode material had approximately the same thickness. These electrodes were made by American Cyanamide of Stamford, Conn., and are known as Type LAA-25; see J. Electrochem. Soc. 122:1619, at page 1620.

In short, the cell comprises an electrolyte chamber having two major external surfaces with circular holes cut in them, and the electrodes are pressed against these holes to physically contain the electrolyte within the chamber. The tabs attached to the current collectors lead outside the cell to the external circuit, which contained a switch, a variable resistor, an ammeter, and a voltmeter. Each face plate provided the ingress and egress ports for the fuel or the oxidizer, as the case may be, and also helped to define a gas chamber for communication with the outward-facing surface of the electrode. In short, the assembled cell configuration and the external circuit were essentially as described in Ind. Eng. Chem. Process Des. Dev. 18:567 (1979), at page 568 (FIG. 1). The flow system for providing fuel and oxidizer to the cell was conceptually based on that shown in FIG. 2 of J. Electrochem. Soc. 122:1619 at p. 1620, and the preparatory procedure was also based on this portion of the article. The gas flow system was designed to provide a flow of ethanol-laden nitrogen to the anode and a flow of moisture-laden oxygen to the cathodes of the cell. Arrangements were also made to provide a flow of hydrogen to either cathode or anode for internal resistance measurements and the like. Internal resistance was measured with a Keithley Instruments 503 Millohmeter connected across the cell. Several minutes were allowed to insure stability of the measurement. Both the oxygen and the hydrogen flow (C. P. grade purity gases in both cases) were passed through distilled water saturators to help minimize evaporation of the electrolyte in the cell. The flow of nitrogen (also C. P. purity) was passed through a saturator containing 200 proof ethanol only. Suitable valves and regulators were provided so that the gas flow (oxygen, nitrogen, or hydrogen) to the cathode and anode could be selected and controlled for preparatory procedures, internal resistance measurements, cell operation, etc.

The electrolyte (up to about 4 ml. total volume) was made up from reagent grade sulfuric acid diluted with distilled water to a 6 N concentration.

The cell was assembled with four 3/16 in.×2 in. (4.8 mm×50.8 mm) bolts to hold all components together. The bolts were tightened to prevent electrolyte leakage during cell operation, and the cell was then installed in the gas flow system. A bubble flow meter was installed after the cell to measure product flow rate.

After the internal resistance measurement was taken, the system was purged with nitrogen for several minutes. Then an oxygen flow was supplied to the gas compartment side of the cathode, and ethanol-saturated nitrogen was supplied to the gas-permeable, liquid-impervious side of the anode, resulting in an ethanol-nitrogen/platinum-PTFE interface. (Presumably, at least some 6 N sulfuric acid may have penetrated from the electrolyte side as far as the PTFE backing or barrier, and thus could also have been "interfacing" with platinum and ethanol.)

Before the polarization run, a steadily rising voltage was observed until the cell reached its open circuit value. The polarization run was carried out by decreasing the resistance in the external circuit stepwise, using the variable resistor. New voltage and current readings were made at 5-minute intervals. The readings were continued until the cell was shorted.

The open circuit voltage was approximately 600 to 610 mv. Other readings were as follows:

| voltage (mv.) | current density (ma/cm$^2$) |
|---|---|
| 500 | 2.5 |
| 455 | 4 |
| 390 | 8 |
| 375 | 11.5 |
| 340 | 15 |
| about 310 | about 21 |
| 275 | 25 |
| 240 | 35 |
| 200 | 43 |
| 170 | 49 |
| 135 | 51.5 |
| 140 | 56 |

EXAMPLE 2

Acetaldehyde and By-product Production

The cell configuration and gas flow system of Example 1 was used in an electrogenerative acetaldehyde production run. In order to measure production, the compositions of both the feed and product stream (on ingress and egress side of anode) were determined by gas chromatographic analysis, using a Carle 8500 Basic Gas Chromatograph. The detector was of the thermal conductivity type and the recorder was a Sargent-Welch Model SRG.

When the cell was ready for electrogenerative production of acetaldehyde, the ethanol-saturated nitrogen flow to the anode was measured at 30 cm$^3$/min with the bubble meter. The oxygen flow was in excess of this. An open circuit voltage of 610 mv was obtained and the gas feed was sampled; 7.4% ethanol was found, the balance being nitrogen. The product stream was sampled at three different voltages: 280 mv, 140 mv, and 60 mv. At 60 mv, the cell was essentially shorted, virtually all of the voltage being developed due to resistance in the platinum tab conductors, internal cell resistance, etc. Even under open circuit conditions, there appeared to be traces of acetaldehyde in the product stream, suggesting that a chemical dehydrogenation at the anode may occur under zero current flow conditions.

Mole per minute (mole/min) rates were calculated by multiplying the mole-% by the flow rate and dividing by the corrected volume per mole (i.e., $0.9515 \times 30$ cm$^3$-min/25744 cm$^3$/mole $= 1.1 \times 10^{-3}$ mole/min).

The results are set forth in Table I.

TABLE I

| | Composition of Feed and Product Streams | | | |
| --- | --- | --- | --- | --- |
| | | Product Stream Composition At: | | |
| Feed Component or Product | Feed Stream Composition (moles/min) | 280 mv 81 ma (moles/min) | 140 mv 170 ma (moles/min) | 60 mv 200 ma (moles/min) |
| Nitrogen | $1.08 \times 10^{-3}$ | $1.13 \times 10^{-3}$ | $1.12 \times 10^{-3}$ | $1.10 \times 10^{-3}$ |
| Acetaldehyde | — | $1.2 \times 10^{-5}$ | $2.76 \times 10^{-5}$ | $3.29 \times 10^{-5}$ |
| Acetal | — | $1.10 \times 10^{-6}$ | $2.56 \times 10^{-6}$ | $4.20 \times 10^{-6}$ |
| Ethanol | $8.62 \times 10^{-5}$ | $1.83 \times 10^{-5}$ | $1.88 \times 10^{-5}$ | $1.93 \times 10^{-5}$ |

The nitrogen level was essentially independent of voltage, as would be expected. However, the ethanol flow rate was also generally independent of voltage, perhaps due to a characteristic vapor pressure at the ethanol/electrolyte interface. It is well known in the chemical arts that acetal (CH$_3$CH[OC$_2$H$_5$]$_2$, sometimes called diethylacetal) is formed at modest temperatures and generally under anhydrous conditions by the reaction of one mole of acetaldehyde with 2 moles of ethanol in the presence of a suitable catalyst. Thus, the formation of acetal is believed to be evidence for the proposition that the ethanol, acetaldehyde, and catalyst come together in the presence of sufficient electrolyte to permit the desired reactions to occur, but not sufficient to provide enough aqueous medium to vitiate conditions favorable to acetal production. It is to be understood that this invention is not bound by any theory, however.

Coulomb rates were calculated from acetaldehyde and acetal production for this electrogenerative production run at each of the three voltages. Dividing by the measured coulomb rate gave current accountability. In this manner, 52–60% of the measured current was accounted for as products in the gas exit stream. Product content in the electrolyte was not measured. Presumably, products dissolved in (or evolved from) the electrolyte would account for the remainder of the measured current. Table II sets forth the coulombic accounting for this run.

TABLE II

| | Calculated vs. Measured Coulomb Rate | | |
| --- | --- | --- | --- |
| Voltage/Current in Circuit | A Calculated Coul. Rate (per min.) | B Measured Coul. Rate (per min.) | % Accountability (A/B × 100) |
| 280 mv / 81 ma | 2.53 | 4.86 | 52.1 |
| 140 mv / 170 ma | 5.83 | 10.2 | 57.2 |
| 60 mv / 200 ma | 7.16 | 12.0 | 59.7 |

In cases where on-site manufacture or storage and sale of acetaldehyde as such is practical, a fuel cell-based production system of this invention can produce the aldehyde economically enough and in sufficient quantities to supply on-site, near-by, and even some relatively distant small or spot markets. Typical of such small markets would be mirror-silvering operations, phenol-aldehyde or urea-aldehyde resin manufacturing, rubber antioxidant or accelerator manufacturing, denaturing of ethyl alcohol, preservation of fruit and fish, preventing mold growth on leather, hardening of certain fibers, and similar small-scale industrial applications.

I claim:

1. A method for making acetaldehyde from ethyl alcohol comprising the steps of:
   (a) bringing an ethyl alcohol-containing fuel into contact with an anode of a fuel cell, which fuel cell includes the anode, a cathode, an electrolyte within the cell, and external circuit means electrically connecting the cathode to the anode, exterior to the fuel cell; and bringing an oxidant into contact with the cathode;
   (b) anodically treating said fuel by electrochemically oxidizing the ethyl alcohol to acetaldehyde at the anode, thereby producing a flow of current in the external circuit means at a voltage in the circuit means from about 1 to 1000 millivolts;
   (c) taking at least the products of the resulting anodically treated fuel out of the oxidation reaction to avoid the formation of condensates or more highly oxidized products at the anode; and
   (d) recovering a major amount of the thus-produced aldehyde.

2. A method according to claim 1 comprising the steps of:
   (a) obtaining a fermentation beer containing about 2 to about 20% by volume of ethyl alcohol;
   (b) volatilizing water and ethyl alcohol in said beer and bringing the water and ethyl alcohol into contact with said anode; and
   (c) electrochemically oxidizing the ethyl alcohol to acetaldehyde at said anode while minimizing formation of any aldol condensation products, acetic acid, or carbon dioxide.

3. A method according to claim 1 wherein said fuel cell is operated within a temperature range of 15°–90° C. and the acetaldehyde produced at said anode is spontaneously distilled out of the aqueous solution in contact with said anode.

4. A method according to claim 3 wherein said electrolyte comprises a catholyte and an anolyte.

5. A method according to claim 2 comprising the additional steps of:
   (d) circulating the resulting oxidized fuel to a distillation zone; and
   (e) distilling acetaldehyde from said oxidized fuel in said distillation zone and collecting substantially anhydrous acetaldehyde by condensation in a condensation zone.

6. A method according to claim 1 wherein said electrolyte contains an ionizable, solution conductivity-improving agent comprising an inorganic Arrhenius acid.

7. A method according to claim 2 wherein said oxidized fuel is, at least in part, dissolved in said electrolyte, and said electrolyte is circulated to a distillation zone maintained at a temperature of less than 70° C.

8. A method according to claim 2 comprising the steps of:
   (a) fermenting cellulosic matter in a fermentation zone to obtain a fermentation beer;
   (b) obtaining purified ethyl alcohol or ethyl alcohol mixed with water from the fermentation beer for use as the ethyl alcohol containing fuel.

9. A method according to claim 1 wherein the acetaldehyde vapor recovered from said anodically treated fuel is trimerized to form para-acetaldehyde.

10. A method according to claim 1 wherein acetaldehyde recovered from said anodically treated fuel is converted to pentaerythritol by interaction with formaldehyde.

11. A method according to claim 1 wherein the ethyl-alcohol-containing fuel is brought into contact with the anode while said fuel is in vapor form.

12. A method according to claim 1 wherein electrical energy is also recovered from said fuel cell.

* * * * *

UNITED STATES PATENT AND TRADEMARK OFFICE
CERTIFICATE OF CORRECTION

PATENT NO. : 4,347,109
DATED : August 31, 1982
INVENTOR(S) : Thomas M. Meshbesher It is certified that error appears in the above-identified patent and that said Letters Patent is hereby corrected as shown below:

In Column 1, prior to line 1, insert:

-- This application is a continuation-in-part of my copending application Serial No. 151,254, filed May 19, 1980, and now abandoned.--

In Column 8, line 19, for "of" read -- or --.

In Column 10, line 26, for "cleaning" read -- cleanly --.

Signed and Sealed this

Sixteenth Day of November 1982

[SEAL]

Attest:

Attesting Officer

GERALD J. MOSSINGHOFF
Commissioner of Patents and Trademarks